US006310741B1

(12) United States Patent
Nishida et al.

(10) Patent No.: US 6,310,741 B1
(45) Date of Patent: Oct. 30, 2001

(54) MAGNETIC DISK APPARATUS WITH DATA TRACK REASSIGNING FUNCTION

(75) Inventors: Yasutaka Nishida, Kokubunji; Takehiko Hamaguchi, Fuchu; Hisashi Takano; Hiroshi Ide, both of Kodaira, all of (JP); Hideki Sawaguchi, La Jolla, CA (US); Futoshi Tomiyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/225,972

(22) Filed: Jan. 5, 1999

(30) Foreign Application Priority Data

Jan. 12, 1998 (JP) .......................... 10-004122

(51) Int. Cl.[7] .......................... G11B 5/09; G11B 15/04; G11B 5/596

(52) U.S. Cl. .......................... 360/53; 360/60; 360/77.02

(58) Field of Search .......................... 360/53, 77.02, 360/75, 77.01, 60

(56) References Cited

U.S. PATENT DOCUMENTS 5,126,895 * 6/1992 Yasuda et al. .................... 360/77.07
5,570,244 * 10/1996 Wiselogel .......................... 360/60
5,918,001 * 6/1999 Ueno et al. .......................... 714/8

FOREIGN PATENT DOCUMENTS

0798698 * 10/1997 (EP) .
10-1998-0075450 11/1998 (KR) .

OTHER PUBLICATIONS

Patent Abstracts of Japan; vol. 018, No. 379 (P–1771), Jul. 15, 1994 & JP 06 103592 A (Ricoh Co., Ltd.), Apr. 15, 1994.*

* cited by examiner

*Primary Examiner*—Regina Y. Neal
(74) *Attorney, Agent, or Firm*—Kenyon & Kenyon

(57) ABSTRACT

When the amount of position error PE of a magnetic head meets the condition of Ewf>PE>=Eww for two threshold values Ewf and Eww meeting Ewf>Eww, the track is registered in the track information table as a track requiring rewrite and the tracks on both sides neighboring to the track are temporarily write-inhibited. The data of the track is rewritten on another track later so as to maintain the data.

By doing this, the offtrack of the recording track can be made smaller without sacrifice of the access speed and the occurrence probability of write fault can be reduced. Furthermore, the reliability of a magnetic disk apparatus can be improved.

13 Claims, 4 Drawing Sheets

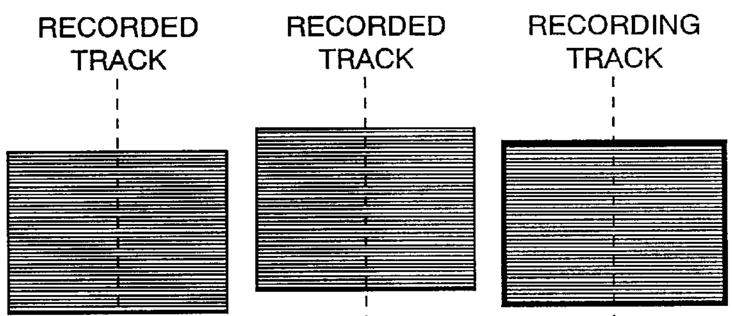
FIG. 5a
NO POSITION ERROR
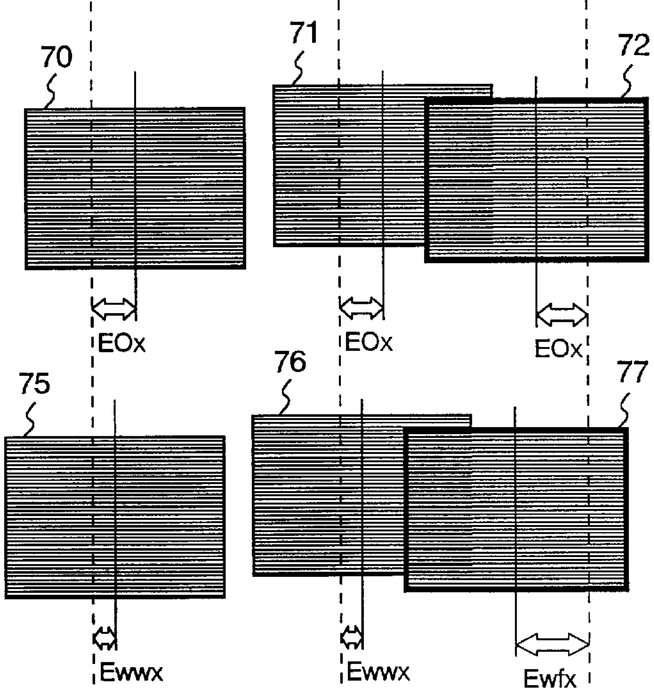
FIG. 5b
WORST CONDITION IN THE CONVENTIONAL SYSTEM
FIG. 5c
WORST CONDITION IN THE SYSTEM OF PRESENT INVENTION

MAGNETIC DISK APPARATUS WITH DATA TRACK REASSIGNING FUNCTION

BACKGROUND OF THE INVENTION

In a magnetic disk apparatus, when an amount of an offtrack of a magnetic head from the target track in the radial direction exceeds a predetermined value during data recording, there is the possibility that a part of the data of the neighboring track is erased and the information of the neighboring track cannot be read.

In a conventional magnetic disk apparatus using an embedded servo system including a data recording area and servo information for a recording track on a magnetic disk medium, a track position signal is demodulated from reproduced servo information during data writing and writing in the state of offtrack is prevented by monitoring the amount of offtrack during writing. Namely, an art for prohibiting the write operation is used when the amount of offtrack of the magnetic head in the direction of track width immediately before writing or during writing is more than a preset value.

SUMMARY OF THE INVENTION

The present invention relates to a magnetic disk apparatus for positioning a magnetic head for a recording track provided on a circular magnetic disk medium and recording information on it.

When the servo quality is high and the sampling cycle is very short, the aforementioned art is effective as an offtrack writing prevention means. However, in a magnetic disk apparatus using the embedded system having no dedicated servo surface and having servo information on the data surface, the location for storing servo signals is limited so as to reserve as many data recording areas as possible and as a result, it is hard to shorten the sampling cycle. Also with respect to a servo signal recorded on a magnetic disk medium, due to effects of vibration during writing of the servo signal, a medium defect, noise, and others, the quality thereof is not always sufficiently high and it is hard to make the specified value for monitoring a write position error sufficiently smaller.

With respect to the reliability of written data, when tracks A, B, and C are lined up side by side, the track A is shifted toward the track B and already written, and the track B is shifted toward the track C and already written, and if, when the track C is to be written, it is shifted toward the track B and written, the state of reproducing the data of the track B is a most severe condition. Therefore, to maintain the reliability, even in a case of combination of the aforementioned worst position errors, it is necessary to reserve the recorded data and it is a condition that the occurrence frequency is very low on a probability basis, so that it is requested to set the specified value for monitoring a position error to a more smaller value.

However, when the specified value for monitoring a position error is set to an extremely small value, write suspension (write fault) occurs frequently and there is the possibility that the equipment performance lowers and a malfunction of write inhibit is caused.

On the other hand, in correspondence with an increase in the recording capacity requested to a magnetic disk apparatus at present and to realize a decrease in cost, it is essential to improve the recording density and it is necessary to narrow the track pitch equivalent to the density in the radial direction on a magnetic disk medium. On a magnetic disk whose track pitch is minimized, the condition for positioning the magnetic head in the direction of track width becomes severe more and more.

The present invention is realized in consideration of such a problem of the prior art and an object of the present invention is to provide a magnetic disk apparatus for making the offtrack of the recording track smaller without sacrifice of the access speed and improving the reliability by reducing the occurrence probability of write fault at the same time.

According to the present invention, the above object is accomplished by detecting a position error of the magnetic head in the direction of track width on a magnetic disk medium by a plurality of threshold values, typically two threshold values and when it is decided that a position error which may cause a failure depending on the state of position error when data is written on the neighboring track, though it is not fatal, is caused (write warning), by writing the data as it is on the track causing offtrack, temporarily write-inhibiting the track neighboring to the track, reading the information written on the track causing the offtrack later when the equipment is in the state of idle, and rewriting the information on another track.

Namely, the magnetic disk apparatus of the present invention comprises a magnetic disk medium having tracks arranged concentrically or spirally, a magnetic head for recording or reproducing for the tracks, a detection means for detecting position information of the magnetic head in the direction of track width during recording, a decision means for deciding the magnitude of a position error of the magnetic head in the direction of track width using the position information and a plurality of threshold values, and a means for limiting the later recording position according to the decision result by the decision means.

The limitation of recording position according to the decision result by the decision means is to temporarily inhibit writing data, for example, when it is decided by the decision means at the time of recording data on a preset track that the amount of offtrack is larger than a preset threshold value, on the whole or a part of one track on both sides neighboring to the track.

When it is decided by the decision means that the amount of offtrack when data is written on the preset track last is larger than the preset threshold value, the data of the track is rewritten on another track so as to maintain the data.

The magnetic disk apparatus of the present invention has a track information table for registering, when it is decided by the decision means that the amount of offtrack when data is written on the preset track last is larger than the preset threshold value, the track as a track requiring rewriting and temporarily registering the track neighboring to the track as a write inhibit track.

Furthermore, the magnetic disk apparatus has a logical-physical address conversion table for converting the logical address of a data write or read instruction from a host device to a physical address on the magnetic disk medium and a means for changing the logical-physical address conversion table at any time.

When it is decided by the decision means that the amount of offtrack when the data is rewritten on the rewritten track is smaller than the preset threshold value, that is, the rewriting succeeds and the data is completely recorded, the means for changing the logical-physical address conversion table at any time updates the logical-physical address conversion table and corresponds the physical address of the rewritten track to the logical address of the track requiring rewriting.

The aforementioned rewrite is executed when the write or read instruction from the host device is monitored, and the instruction is not issued, and the operation by an instruction from the host device is not necessary.

Typically, when the amount of position error PE meets the condition of Ewf>PE>=Eww for two threshold values Ewf and Eww meeting Ewf>Eww, the decision means registers the track in the track information table as a track requiring rewrite and temporarily write-inhibits the tracks on both sides neighboring to the track.

Or, when the amount of position error PE meets the condition of Ewf>PE>=Eww for two threshold values Ewf and Eww meeting Ewf>Eww, the decision means registers the track in the track information table as a track requiring rewrite and temporarily write-inhibits the track neighboring to the track in the direction of position error. However, in this case, it is necessary to know not only the magnitude of the amount of position error PE but also the direction of the position error.

According to the magnetic disk apparatus of the present invention, when the threshold value for monitoring a position error is set in a plurality of stages, typically 2 stages and the rewrite process by write warning is executed, it is possible to make the offtrack of the recording track smaller without sacrifice of the access speed. By doing this, the threshold value of write fault can be increased, and the occurrence probability of write fault reduces, and the reliability improves. At the same time, since the occurrence probability of write fault reduces, the frequency of retry reduces and the access speed during write improves. Furthermore, since the offtrack of the recording track becomes smaller, the error rate during read improves and the reliability and access speed improve.

BRIEF DESCRIPTION OF THE DRAWINGS

FIG. 5 is a drawing for explaining the relationship of offtrack on a magnetic disk medium.

DETAILED DESCRIPTION OF THE PREFERRED EMBODIMENTS

The embodiments of the present invention will be explained hereunder with reference to the accompanying drawings.

Figure 1:
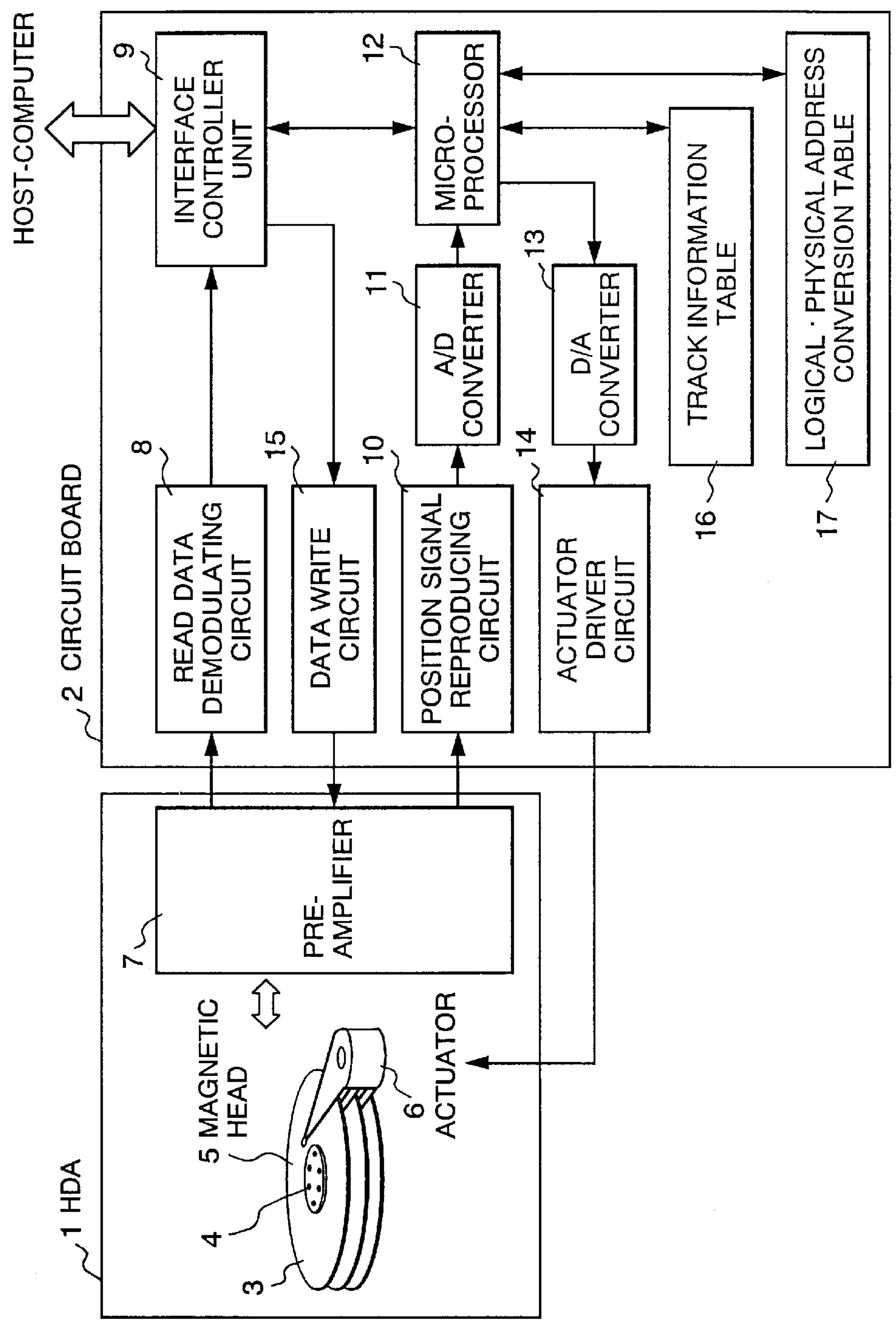
FIG. 1 is a block diagram showing an example of the constitution of a magnetic disk apparatus of the present invention.

FIG. 1 is a block diagram showing an example of the constitution of a magnetic disk apparatus of the present invention. In FIG. 1, inside an HDA (head disk assembly) 1, a plurality of magnetic disk media 3 rotating by a motor 4, a plurality of magnetic heads 5 opposite to each of the magnetic disk media 3, an actuator 6 for moving each magnetic head 5 in one, and a pre-amplifier 7 for writing and reading the magnetic heads are housed.

Outside the HDA 1, a circuit board 2 is fixed. The output from the pre-amplifier 7 is inputted to a read data demodulating circuit 8, demodulated to digital data, and then inputted to an interface controller unit 9. The interface controller unit 9 is connected to a host computer via a connector and an interface cable.

The output from the pre-amplifier 7 is also inputted to a position signal reproducing circuit 10 and a position signal of the magnetic heads 5 demodulated by the position signal reproducing circuit 10 is inputted to an A/D converter 11. The A/D converter 11 is connected to a microprocessor 12. The microprocessor 12 fetches position information and performs the calculation for the seek or track follow-up operation. The microprocessor 12 performs the conversion process from logical address to physical address and the write inhibit track management as described later and a logical-physical address conversion table 17 and a track information table 16 for that purpose are connected to the microprocessor 12. The microprocessor 12 may be replaced with a gate array, ASIC, or other logical means if each of them can realize the same function.

The output of the microprocessor 12 is converted to an analog signal by a D/A converter 13 and inputted to an actuator driver circuit 14, which generates a drive current for the actuator 6 and controls positioning of the magnetic heads 5.

During data write, data is sent to a data write circuit 15 from the interface controller unit 9 and performs the write operation for the magnetic heads 5 via the write circuit in the pre-amplifier 7.

Figure 2:
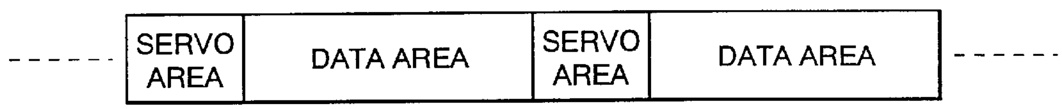
FIG. 2 is a drawing showing the constitution of tracks on a magnetic disk medium.

FIG. 2 shows a schematic view of the constitution of tracks on a magnetic disk medium. On each track, a servo area and a data area are alternately arranged and several tens servo areas are arranged on one track (one round). A position signal is reproduced in each servo area and position information and physical track No. information are obtained.

The microprocessor 12 generally performs following control for following up tracks. When the host computer issues a write command, the microprocessor starts the interface process for decoding the command. In this case, the microprocessor converts the write logical address from the host computer using the logical-physical address conversion table 17 and decides a physical write address (track, sector, etc.). When movement to the track to be written is necessary, the microprocessor 12 starts the seek control.

After the seek control or seek process is finished, the microprocessor 12 returns to the following control or following process again and when the positioning to the target track of the magnetic head 5 is sufficiently stabilized, a command complete signal for notifying the end of seek control becomes active. After the command complete signal becomes active, the microprocessor reads ID information and starts the data write operation when the discriminated information is correct.

When large data extending a plurality of sectors is to be written, in a servo area between data areas, a servo signal is demodulated and subjected to following control and in a data area, data is written again. In this case, from the demodulation result of the servo signal, the amount of position error of the magnetic head from the track center is monitored.

Conventionally, when the amount of position error is more than a predetermined specified value, it is decided as a write fault, and the write operation is stopped, and writing is attempted for the same track again, and when a write fault occurs several times, it is decided as a write error.

Figure 3:
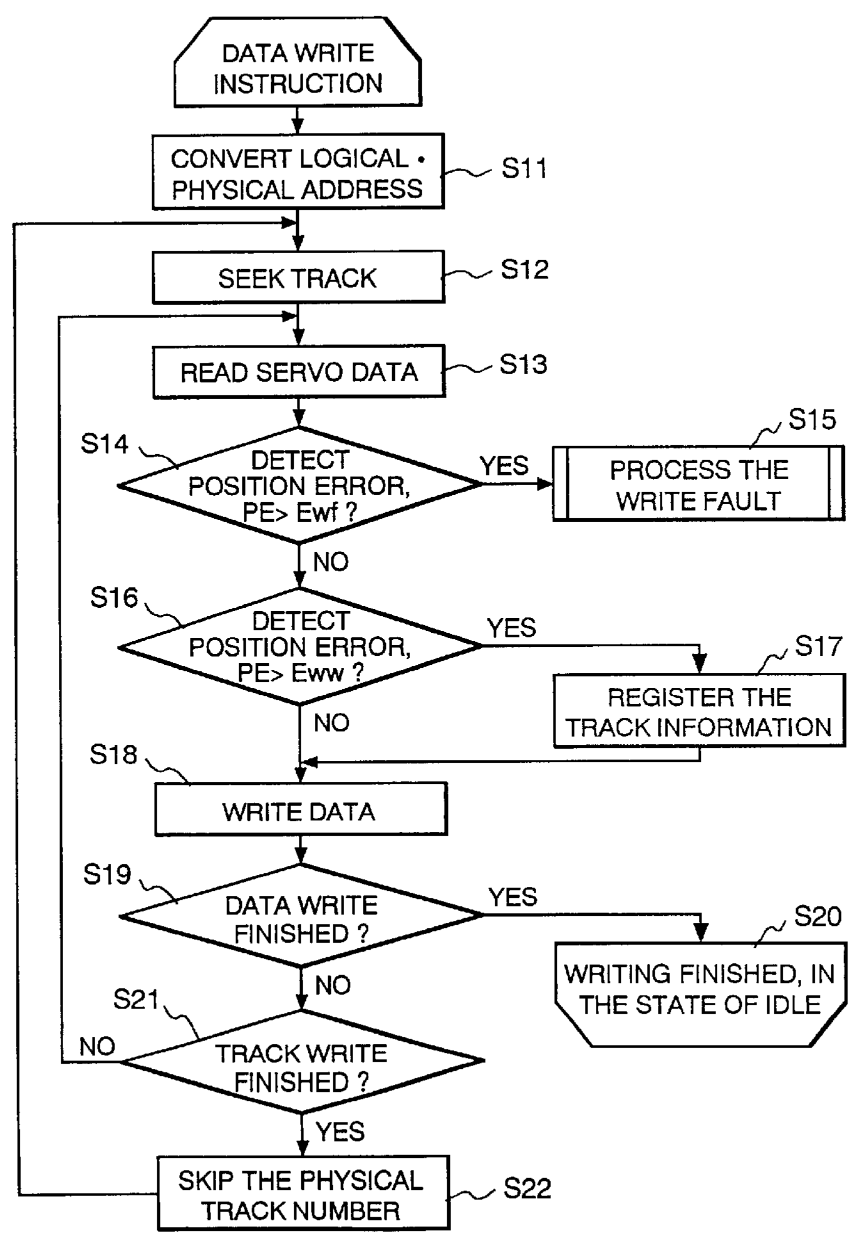
FIG. 3 is a flow chart for explaining the sequence of the data write process by a magnetic disk apparatus of the present invention.

FIG. 3 shows a flow chart of the write process of this equipment. When a data write instruction is issued from the host computer, the microprocessor 12 examines the recording enable area on the disk 3 using the logical-physical address conversion table 17 and the track information table 16, decides the recording track (Step 11), and moves the magnetic head 5 to the desired track (Step 12). After seek completion, the microprocessor reads the servo data and performs the following operation (Step 13).

In this example, the allowable threshold value of position error (PE) is divided into 2 stages (Ewf, Eww (Ewf>Eww)) and the position error is monitored. In detection of position error at Step 14, PE>Ewf is decided, and in the case of YES, Write Fault (WF) is decided on the assumption that there is the possibility that the position error results in a fatal failure, and the write fault process is performed (Step 15). When NO is decided in detection of position error at Step 14, in detection of position error at Step 16, PE>Eww is decided, and in the case of NO, it is decided that the position error is sufficiently small, and the program goes to Step 18, and the data is written as it is. When YES is decided in detection at Step 16, it is decided that the position error is comparatively larger on the corresponding track and there is the possibility that it results in a failure depending on the state of position error when data is written on the neighboring track, though it is not fatal (write warning: WW), and the corresponding track is registered in the track information table 16 as write warning WW (Step 17), and thereafter, the program goes to Step 18, and the data is written on the corresponding track as it is. The tracks on both sides neighboring to the track registered in the track information table 16 as write warning WW are temporarily write-inhibited.

At Step 19, it is decided whether data write is finished, and when it is finished, the program goes to Step 20, and the writing is finished, and the equipment enters the state of idle. When it is decided in detection at Step 19 that data to be written remains, it is decided at Step 21 whether a data write enable area remains on the track, and when it remains, the program returns to Step 13, and by detecting a position error of the magnetic head, data is also written on the track.

When recording a large amount of continuous data extending a plurality of tracks, data is written according to the aforementioned sequence and after writing on one track (track N) is finished, the program goes to Step 22 from Step 21. When the track is decided as write warning WW in detection at Step 16 prior to it, the writing on the neighboring two tracks is inhibited, so that the process at Step 22 unconditionally skips the neighboring tracks, examines an empty track, goes to Step 12, seeks the track, and writes the continued data. When the decision at Step 16 is NO, the process at Step 22 examines a data write enable track without skipping the neighboring tracks, goes to Step 12, seeks the selected track, and writes data on it (when the neighboring tracks are write enabled, the continued data is written on the neighboring tracks).

When this process is repeated and the recording of a series of data is finished, the writing is finished, and the program goes to Step 20 from Step 19, and the equipment enters the state of idle. In the state of idle at Step 20, when the write/read command from the host computer is stopped and a fixed time elapses, the program is automatically moved to the rewriting process.

Figure 4:
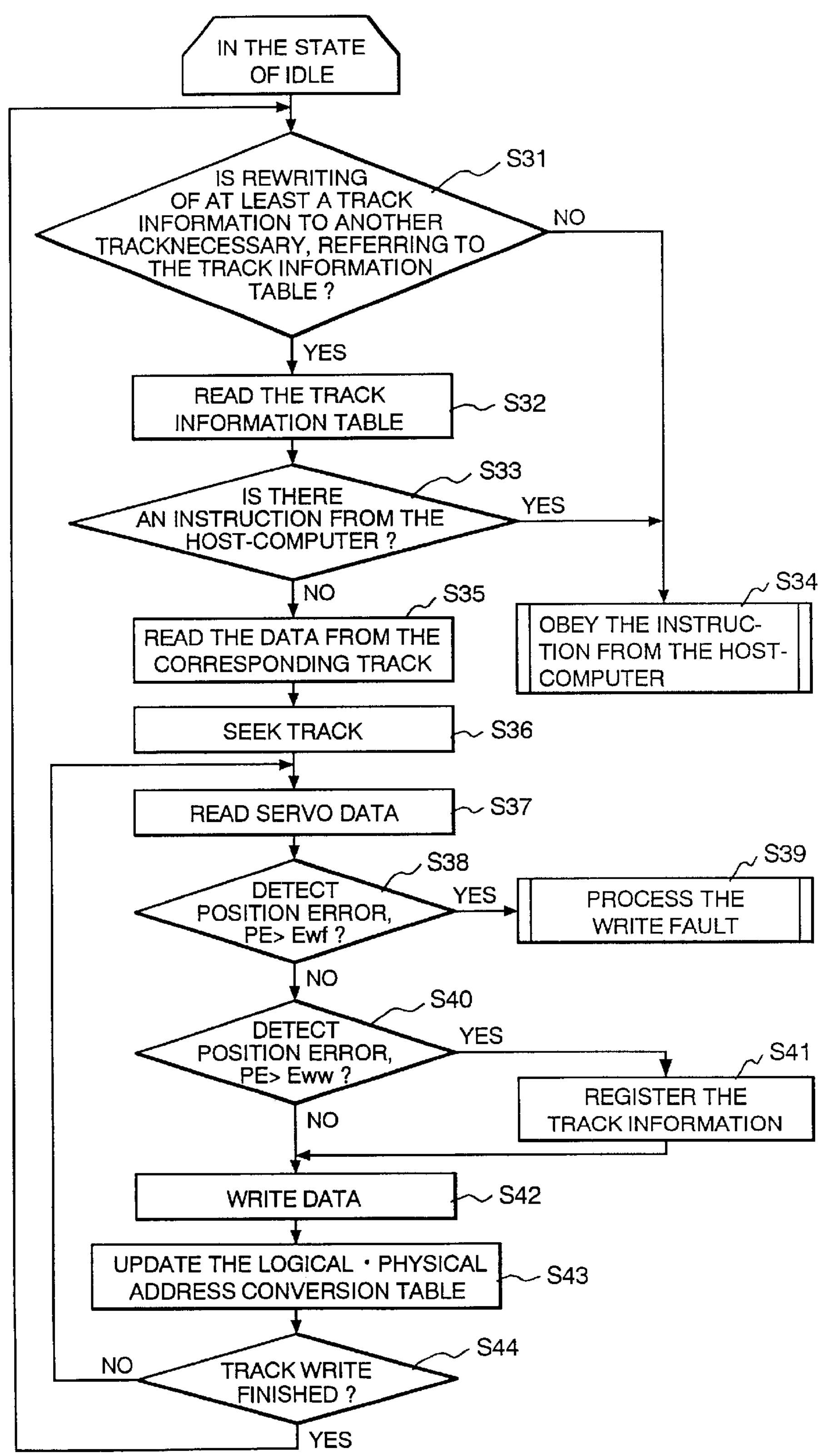
FIG. 4 is a flow chart for explaining the sequence of the data rewrite process by a magnetic disk apparatus of the present invention.

FIG. 4 shows a flow chart of the rewriting process. The rewriting process is a process of re-recording data of a track among tracks written until immediately before which is decided as write warning WW and saved on the track information table 16 on an empty track. When a fixed time elapses in the state of idle, the microprocessor 12 examines whether there is a track registered as write warning WW in the track information table 16 (Step 31), and when no track is registered, the equipment enters the state of idle again and obeys an instruction from the host computer (Step 34).

When a track registered as write warning WW exists in the track information table in detection at Step 31, the program goes to Step 32 and the track information table 16 is read. Next, the program goes to Step 33 and checks whether there is an instruction from the host computer and when there is an instruction, the rewriting is stopped and the equipment obeys an instruction from the host computer (Step 34). When there is no instruction, the data on the track registered in the track information table as write warning WW is read (Step 35), and the magnetic head is moved to the write enable track (Step 36), and the corresponding data is written.

In this case, the servo data is read (Step 37), and in the same way as with the normal write process explained in FIG. 3, a position error in 2 stages is decided (Steps 38, 40), and when it is decided as write fault WF, the write fault process is performed (Step 39), and when it is decided as write warning WW, the corresponding track is registered in the track information table 16 as write warning WW (Step 41), and then data is written (Step 42).

When the data write on the corresponding track is finished, the program returns to Step 31 from Step 44, and whether write warning WW is registered in the track information table is checked again, and the same process is repeated. With respect to a track succeeding in rewriting, the logical-physical address conversion table is updated (Step 43) and the physical track succeeding in rewriting corresponds to the logical address of the corresponding data. Whether there is an instruction from the host computer is confirmed every rewriting on one track and an instruction from the host computer is executed on a priority basis. When rewriting of all the tracks registered in the write warning WW table is finished, the rewrite process is finished and the equipment is moved to the state of idle.

On a track (complete track) which is not decided as write fault WF or write warning WW, data is written in the state of sufficiently small position error. Therefore, the threshold value of write fault decision when data is to be written on the neighboring tracks of the complete track can be made larger compared with the case of monitoring of position error in 2 stages.

Setting of a threshold value of write fault decision will be explained by referring to FIG. 5. FIG. 5(*a*) is a drawing showing an ideal state of no position error. FIG. 5(*b*) is a drawing showing an arrangement under the worst condition of position error in the conventional system. E0x indicates the amount of worst offtrack when the threshold value of write fault decision in the conventional system is set to E0. Recorded tracks 70 and 71 are recorded by shifting in the direction of approaching a recording track 72 by E0x. The recording track 72 is also written by shifting toward the recorded track 71 by E0x and a part is overwritten on the recorded track 71. In this case, if it is attempted to reproduce the track 71, a part of the track 71 is overwritten on the track 72, and a reproduced signal is small, and moreover a part of recording signals of the neighboring tracks 70 and 72 is read as a noise. Therefore, in consideration of both the amount of worst offtrack of the neighboring tracks already recorded and the amount of worst offtrack of the track being recorded at present, the threshold value E0 of position error of write fault is set.

FIG. 5(*c*) is a drawing showing an arrangement of tracks under the worst condition in the system of the present invention. In monitoring of position error in two stages, the threshold values Ewf and Eww in two stages are set so as to meet the relationship of Ewf>E0>Eww. When the neighboring track 76 already recorded is a complete track, the amount of worst offtrack is Ewwx smaller than E0x. Therefore, even if the amount of offtrack of the track 77 being recorded at present is E0x, which is larger than the one in the case of monitoring, the possibility that the data of the neighboring track 76 recorded is destroyed is low.

In this example, the neighboring two tracks of a track decided as write warning WW are write-inhibited and when a large amount of continuous data extending a plurality of tracks is to be recorded, the recorded two tracks 75 and 76 neighboring to the recording track 77 are always complete tracks and have the relationship shown in FIG. 5(*c*).

Namely, even if a failure occurs on the complete track 76 that a part thereof is erased due to offtrack of the neighboring track 77, it is only an effect from one side and the offtrack of the self track is small, so that the effect is smaller than that of the conventional method.

When the threshold value Ewf which becomes a write fault increases, the probability that it becomes a write fault naturally reduces and the reliability improves. The position error of recorded data during reading is small, so that the error rate improves. At the same time, the probability of performing the retry operation due to a position error during write/read reduces and as a result, the access speed improves.

The threshold value Eww of write warning is smaller than the specified value E0 of write fault in the conventional system (E0>Eww) and the occurrence probability is high. However, even if write warning WW occurs, there is no need to suspend the write process and the rewrite process is performed by use of the time of the state of idle that there is no instruction from the host computer, so that there are few disadvantages in the access speed.

In the above embodiment, an example that one track neighboring to the inner periphery of a track on which write warning WW occurs and one track neighboring to the outer periphery are temporarily write-inhibited and the recorded contents of the track on which write warning WW occurs are rewritten on another track later is explained. However, it is possible to fetch information on the direction of position error in the detection of position error at Step 16 shown in FIG. 3 and write-inhibit only one track neighboring in the shifted direction.

In this embodiment, the write position is controlled in track units including a plurality of sectors. However, it is possible to change the control unit to the sector unit and execute write inhibit and address conversion in sector units.

In a magnetic disk apparatus in which tracks are spirally arranged, a disk cannot be physically delimited in track units. In this case, by distinguishing sectors equivalent to about one round as one track and performing the same control so as to prevent the neighboring one of a track or sector of write warning from writing, the present invention can be executed.

What is claimed is:

1. A magnetic disk apparatus comprising:

a magnetic disk medium having tracks arranged concentrically or spirally, a magnetic head for recording or reproducing for said tracks, detection means for detecting position information of said magnetic head in the direction of track width during recording, decision means for deciding the magnitude of a position error of said magnetic head in the direction of track width using said position information and a plurality of threshold values, and means for limiting the recording on a track according to a decision result by said decision means wherein when the off-track outbreaks and said magnitude of a position error is decided to be larger than the preset threshold value by said decision means at the time of the recording, the writing operation on said track is continued, the writing operation on the whole or a part of one track on both sides neighboring to said track is temporarily inhibited by said means for limiting the recording on a track.

2. A magnetic disk apparatus according to claim 1, wherein when it is decided by said decision means that the amount of offtrack when data is written on a track last is larger than a preset threshold value, said magnetic disk apparatus has a function for rewriting said data of said track on another track.

3. A magnetic disk apparatus according to claim 2, wherein said magnetic disk apparatus has a logical-physical address conversion table for converting a logical address of a data write or read instruction from a host device to a physical address on said magnetic disk medium and means for changing said logical-physical address conversion table at any time.

4. A magnetic disk apparatus according to claim 2, wherein when it is decided by said decision means that the amount of offtrack when said data is rewritten on said rewritten track is smaller than said preset threshold value, said means for changing said logical-physical address conversion table at any time updates said logical-physical address conversion table and corresponds said physical address of said rewritten track to said logical address of said track requiring rewriting.

5. A magnetic disk apparatus according to claim 2 wherein said rewrite is executed when a write or read instruction from a host device is monitored, and said instruction is not issued, and an operation by an instruction from said host device is not necessary.

6. A magnetic disk apparatus according to claim 1, wherein when it is decided by said decision means that the amount of offtrack when data is written on a track last is larger than a preset threshold value, said magnetic disk apparatus has a track information table for registering said track as a track requiring rewriting and temporarily registering a track neighboring to said track as a write inhibit track.

7. A magnetic disk apparatus according to claim 6, wherein when the amount of position error PE meets a condition of Ewf>PE>=Eww for two threshold values Ewf and Eww meeting Ewf>Eww, said decision means registers said track in said track information table as a track requiring rewrite and temporarily write-inhibits tracks on both sides neighboring to said track.

8. A magnetic disk apparatus according to claim 6, wherein when the amount of position error PE meets a condition of Ewf>PE>=Eww for two threshold values Ewf and Eww meeting Ewf>Eww, said decision means registers said track in said track information table as a track requiring rewrite and temporarily write-inhibits a track neighboring to said track in the direction of position error.

9. A magnetic disk apparatus according to claim 6, wherein said magnetic disk apparatus has a logical-physical address conversion table for converting a logical address of a data write or read instruction from a host device to a physical address on said magnetic disk medium and means for changing said logical-physical address conversion table at any time.

10. A magnetic disk apparatus according to claim 9, wherein when it is decided by said decision means that the amount of offtrack when said data is rewritten on said rewritten track is smaller than said preset threshold value, said means for changing said logical-physical address conversion table at any time updates said logical-physical address conversion table and corresponds said physical address of said rewritten track to said logical address of said track requiring rewriting.

11. A magnetic disk apparatus according to claim 10, wherein said rewrite is executed when a write or read instruction from a host device is monitored, and said instruction is not issued, and an operation by an instruction from said host device is not necessary.

12. A magnetic disk apparatus according to claim 11, wherein when the amount of position error PE meets a condition of Ewf>PE>=Eww for two threshold values Ewf and Eww meeting Ewf>Eww, said decision means registers said track in said track information table as a track requiring rewrite and temporarily write-inhibits a track neighboring to said track in the direction of position error.

13. A magnetic disk apparatus according to claim 10, wherein when the amount of position error PE meets a condition of Ewf>PE>=Eww for two threshold values Ewf and Eww meeting Ewf>Eww, said decision means registers said track in said track information table as a track requiring rewrite and temporarily write-inhibits tracks on both sides neighboring to said track.

* * * * *